United States Patent
Min

(10) Patent No.: US 12,316,960 B2
(45) Date of Patent: May 27, 2025

(54) CAMERA MODULE AND MOBILE DEVICE

(71) Applicant: SAMSUNG ELECTRO-MECHANICS CO., LTD., Suwon-si (KR)

(72) Inventor: Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 196 days.

(21) Appl. No.: 18/108,228

(22) Filed: Feb. 10, 2023

(65) Prior Publication Data

US 2023/0308747 A1 Sep. 28, 2023

(30) Foreign Application Priority Data

Mar. 22, 2022 (KR) .................. 10-2022-0035316

(51) Int. Cl.
- *H04N 23/65* (2023.01)
- *H04N 23/667* (2023.01)
- *H04N 23/68* (2023.01)

(52) U.S. Cl.
CPC ......... *H04N 23/651* (2023.01); *H04N 23/667* (2023.01); *H04N 23/68* (2023.01)

(58) Field of Classification Search
CPC .... H04N 23/651; H04N 23/667; H04N 23/68; H04N 23/6812; H04N 23/55; H04N 23/57
See application file for complete search history.

(56) References Cited

U.S. PATENT DOCUMENTS

| | | | |
|---|---|---|---|
| 2011/0142433 A1* | 6/2011 | Gerhards | G03B 5/00 396/72 |
| 2016/0173783 A1* | 6/2016 | Kim | H04N 23/651 348/208.11 |
| 2020/0158752 A1 | 5/2020 | Eom et al. | |

FOREIGN PATENT DOCUMENTS

| | | |
|---|---|---|
| JP | 2009-115895 A | 5/2009 |
| KR | 10-2006-0055217 A | 5/2006 |
| KR | 10-2010-0097534 A | 9/2010 |
| KR | 10-2020-0056722 A | 5/2020 |

OTHER PUBLICATIONS

Korean Office Action issued on Oct. 12, 2023, in counterpart Korean Patent Application No. 10-2022-0035316 (7 pages in English, 5 pages in Korean).

* cited by examiner

*Primary Examiner* — Timothy J Henn
(74) *Attorney, Agent, or Firm* — NSIP Law

(57) ABSTRACT

A camera module includes a controller executing an anti-shock mode including a low power mode and a wakeup mode to alternately perform the low power mode and the wakeup mode when the anti-shock mode is enabled, and controlling a position of a lens based on a lens position detected during performing of the wakeup mode, a timer for generating an interrupt signal at predetermined wakeup time intervals and outputting the interrupt signal to the controller, while the anti-shock mode is executed, a lens position obtaining unit detecting the lens position and providing the detected lens position to the controller during the wakeup mode, and a lens driving unit adjusting the position of the lens to an anti-shock position according to position control of the controller during the wakeup mode.

20 Claims, 7 Drawing Sheets

CAMERA MODULE AND MOBILE DEVICE

CROSS-REFERENCE TO RELATED APPLICATIONS

This application claims the benefit of priority to Korean Patent Application No. 10-2022-0035316 filed on Mar. 22, 2022, in the Korean Intellectual Property Office, the entire disclosure of which is incorporated herein by reference for all purposes.

BACKGROUND

1. Field

The present disclosure relates to a camera module and a mobile device.

2. Description of the Background

In general, camera modules applied to mobile devices, such as mobile phones or the like, may include autofocusing (AF) and optical image stabilization (OIS) functions to capture high-definition images, and in order to implement the functions, camera modules may include an image sensor, an actuator including a lens, a gyro sensor for measuring hand-shake, a position sensor for identifying a current position of a lens, and the like.

In addition, camera modules may move and control lenses for AF or OIS, and camera modules may include an optical zoom function to improve the quality of magnified images.

In order to operate such AF, OIS or zoom functions, the position of a lens may need to be moved. A spring type or ball guide method may be used to couple an actuator and a lens barrel so that a lens may move for the AF, OIS, or zoom operations.

Power may not be applied to camera modules when not in use. In such a situation where power is not applied, the lens may move idly to collide with a surrounding structure to cause unnecessary flow noise.

In particular, in the ball guide method, when a zoom magnification is high, a weight of the lens and a moving distance of the lens may increase, and in this case, in a state in which power is not applied, unnecessary flow noise may become more severe.

In addition, when a mobile device, such as a mobile phone, receives an external shock, the lens unit inside the camera module may move unnecessarily to make a shock sound, and here, since the lens is formed of a movable member that may vary in position to support operations, such as OIS, AF, and zoom, when the camera module is not used, an external shock may be transmitted to the camera module as it is, and as described above, a shock sound may be made as the lens is unnecessarily moved.

In order to prevent such shock noise, in the camera module, a lens position may be detected in a state in which power is continuously applied, to execute closed loop control when the recognized lens position is less than or greater than a threshold value, and when the lens position is greater than or less than the threshold value, the position of the lens may be appropriately changed to prevent the lens from moving, so that the lens may not collide with a wall to make a sound or may not be damaged.

However, such a camera module may have high power consumption because power should be always applied.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a controller executing an anti-shock mode including a low power mode and a wakeup mode to alternately perform the low power mode and the wakeup mode when the anti-shock mode is enabled, and controlling a position of a lens based on a lens position detected during performing of the wakeup mode, a timer for generating an interrupt signal at predetermined wakeup time intervals and outputting the interrupt signal to the controller, while the anti-shock mode is executed, a lens position obtaining unit detecting the lens position and providing the detected lens position to the controller during the wakeup mode, and a lens driving unit adjusting the position of the lens to an anti-shock position according to position control of the controller during the wakeup mode.

The controller may perform the wakeup mode at the wakeup time intervals based on the interrupt signal from the timer.

The controller may determine whether the lens position is outside of a preset lens position range during the wakeup mode, and perform the low power mode when the lens position is not outside of the range.

The controller may determine whether the lens position is outside of a preset lens position range during the wakeup mode, and control a preset position of the lens when it is determined that the lens position is outside of the range.

The anti-shock execution command may be input from a mobile device processor when the camera module is not used.

The anti-shock execution command may be input from a mobile device processor when there is an external shock on the mobile device, without using the camera module.

When an anti-shock release command is generated when there is no external shock to the mobile device during the execution of the anti-shock mode, the controller may stop the execution of the anti-shock mode in response to the anti-shock release command.

When the anti-shock release command is not input during execution of the anti-shock mode, the controller may maintain the execution of the anti-shock mode.

A mobile device may include the camera module and a mobile device processor generating the anti-shock execution command when an anti-shock execution condition is met.

In another general aspect, a mobile device includes a mobile device processor generating an anti-shock execution command when an anti-shock execution condition is met, and a camera module, when the anti-shock execution command is input, executing an anti-shock mode including a low power mode and a wakeup mode in response to the anti-shock execution command, wherein the camera module includes a controller alternately performing the low power mode and the wakeup mode to control a position of a lens based on a lens position detected during performing of the wakeup mode, during the execution of the anti-shock mode, a timer for generating an interrupt signal at predetermined wakeup time intervals and outputting the interrupt signal to the controller, while the anti-shock mode is executed, a lens position obtaining unit detecting the lens position and providing the detected lens position to the controller during the wakeup mode, and a lens driving unit adjusting the position of the lens to an anti-shock position according to position control of the controller during the wakeup mode.

When the camera module is not used, the mobile device processor may generate the anti-shock execution command and output the generated anti-shock execution command to the camera module.

The mobile device processor may generate the anti-shock execution command and output the generated anti-shock execution command to the camera module when there is an external shock to the mobile device without using the camera module.

When an anti-shock release command is generated when there is no external shock to the mobile device during the execution of the anti-shock mode, the controller may stop the execution of the anti-shock mode in response to the anti-shock release command.

In another general aspect, a camera module includes a controller executing a low power mode when the camera module is not in use and receiving an interrupt signal at a predetermined time interval or an anti-shock execution command signal to execute a wakeup mode, a lens position obtaining unit transmitting a lens position signal to the controller during the wakeup mode, and a lens driving unit driving a position of the lens during the wakeup mode, wherein the controller in response to the interrupt signal or the anti-shock execution command signal, controls the lens driving unit to drive the position of the lens to an anti-shock position in response to the lens position signal during the wakeup mode.

The camera module may further include a timer transmitting the interrupt signal at the predetermined time interval to the controller.

A mobile device may include the camera module and a mobile device processor transmitting the anti-shock execution command signal when a predetermined anti-shock execution threshold is met.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
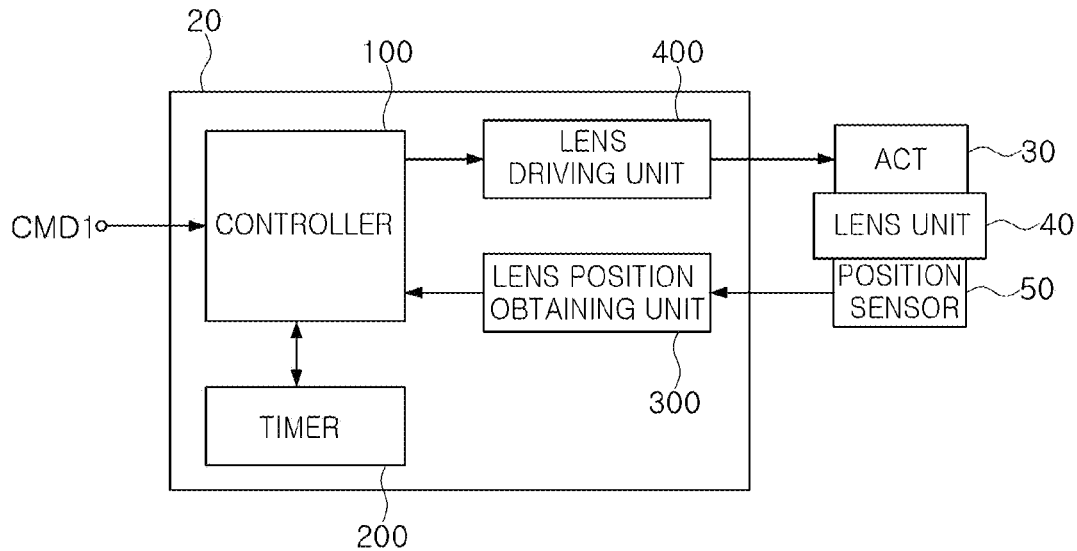
FIG. 1 is a view of a camera module according to an example embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Example embodiments provide a camera module and a mobile device capable of preventing a collision caused by lens movement of a camera module with low power by executing an anti-shock mode when the camera module of the mobile device is not used.

Figure 2:
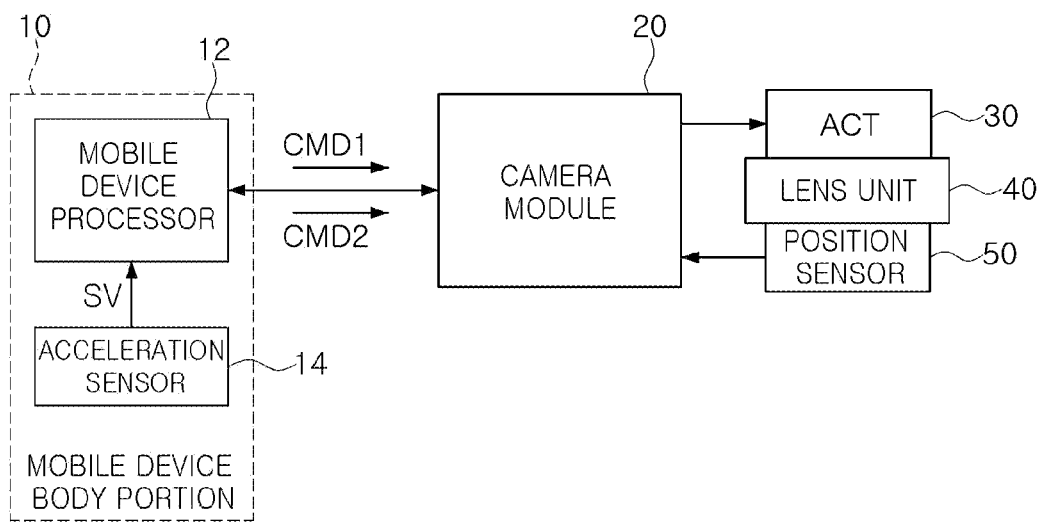
FIG. 2 is a view of a mobile device according to an example embodiment of the present disclosure.

FIG. 1 is a view of a camera module according to an example embodiment of the present disclosure, and FIG. 2 is a view of a mobile device according to an example embodiment of the present disclosure.

Referring to FIG. 1, a camera module 20 according to an example embodiment of the present disclosure may include a controller 100, a timer 200, a lens position obtaining unit 300, and a lens driving unit 400.

When an anti-shock mode is enabled, the controller 100 may execute an anti-shock mode including a low power mode and a wakeup mode to alternately perform the low power mode and the wakeup mode, and here, the controller 100 may be synchronized with an interrupt signal Sint to perform the wakeup mode and may perform position control of a lens based on a lens position detected during the wakeup mode.

For example, the controller 100 may enable the anti-shock mode when an external anti-shock execution command is received or when a camera operation is not performed internally.

The timer 200 may generate the interrupt signal Sint at intervals of a predetermined wakeup time T1 and output the interrupt signal Sint to the controller 100 during the execution of the anti-shock mode.

The lens position obtaining unit 300 may detect a lens position of a lens unit 40 through a position sensor 50 and provide lens position information to the controller 100 during the wakeup mode of the anti-shock mode.

The lens driving unit 400 may adjust the lens position of the lens unit 40 to a preset anti-shock position through an actuator (ACT) 30 according to position control of the controller 100 during the wakeup mode.

Meanwhile, the controller 100, the timer 200, the lens position obtaining unit 300, and the lens driving unit 400 may be configured as separate processors or may be configured as a single processor.

For each drawing of the present disclosure, unnecessary redundant descriptions of the components having the same reference numerals and the same functions may be omitted, and differences therebetween may be described for each drawing.

Referring to FIG. 2, a mobile device 1 according to an example embodiment of the present disclosure may include a mobile device body portion 10 and a camera module 20.

For example, the mobile device body portion 10 may include a mobile device processor 12 and an acceleration sensor 14.

The mobile device processor 12 may generate an anti-shock execution command CMD1 and transmit the anti-shock execution command CMD1 to the camera module 20 when an anti-shock execution condition is met. For example, the anti-shock execution condition may be when an external shock occurs based on an acceleration sensing signal SV, but is not limited thereto.

The acceleration sensor 14 may detect an external shock of the mobile device 1 and output the acceleration sensing signal SV to the mobile device processor 12.

For example, when the camera module is not used, the mobile device processor 12 may generate the anti-shock execution command CMD1 and output the anti-shock execution command CMD1 to the camera module 20.

As another example, when the camera module is not used and there is an external shock to the mobile device 1, the mobile device processor 12 may generate the anti-shock execution command CMD1 and output the anti-shock execution command CMD1 to the camera module 20.

In addition, when there is no external shock during the execution of the anti-shock mode, the mobile device processor 12 may generate an anti-shock release command CMD2 and transmit the anti-shock release command CMD2 to the camera module 20.

When the anti-shock execution command CMD1 is input from the mobile device body portion 10, the camera module 20 may execute the anti-shock mode including a low power mode and a wakeup mode, in response to the anti-shock execution command CMD1.

Since the camera module 20 is the same as that described above with reference to FIG. 1, a detailed description thereof will be omitted.

In addition, when the anti-shock release command CMD2, generated when there is no external shock to the mobile device, is input during the execution of the anti-shock mode, the controller 100 may stop the execution of the anti-shock mode in response to the anti-shock release command CMD2.

Also, while the anti-shock mode is executed, if the anti-shock release command CMD2 is not input, the controller 100 may continue to execute the anti-shock mode.

Figure 3:
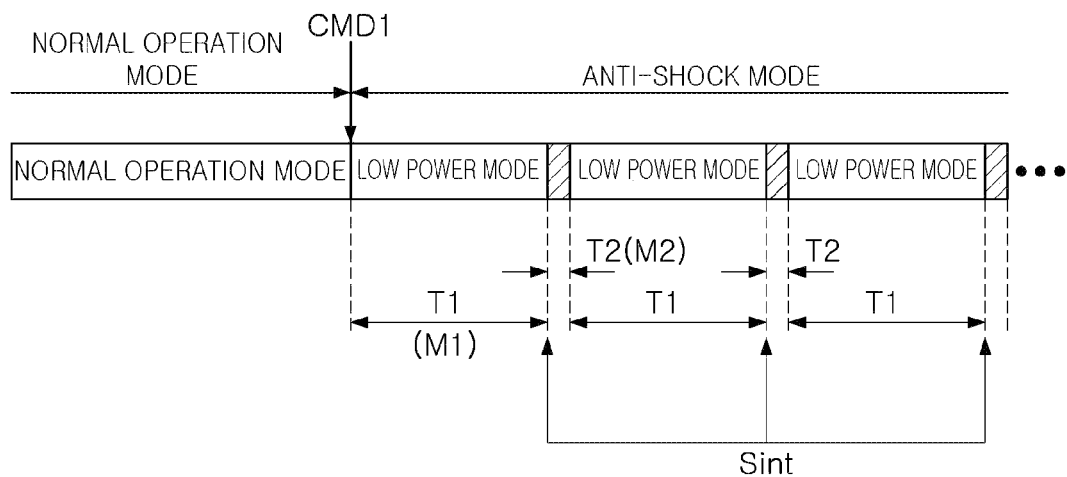
FIG. 3 is a view illustrating an example of a low power mode and a wakeup mode of an anti-shock mode.

FIG. 3 is a view illustrating an example of a low power mode and a wakeup mode of an anti-shock mode.

Referring to FIGS. 2 and 3, when the anti-shock execution command CMD1 is received, the controller 100 may execute the anti-shock mode and, based on the interrupt signal Sint from the timer 200, the controller 100 may alternately perform the low power mode M1 and the wakeup mode M2 at intervals of the wakeup time T1.

In FIG. 3, T1 is a wakeup time, which may be a low power mode execution time, and T2 may be a wakeup mode execution time.

Figure 4:
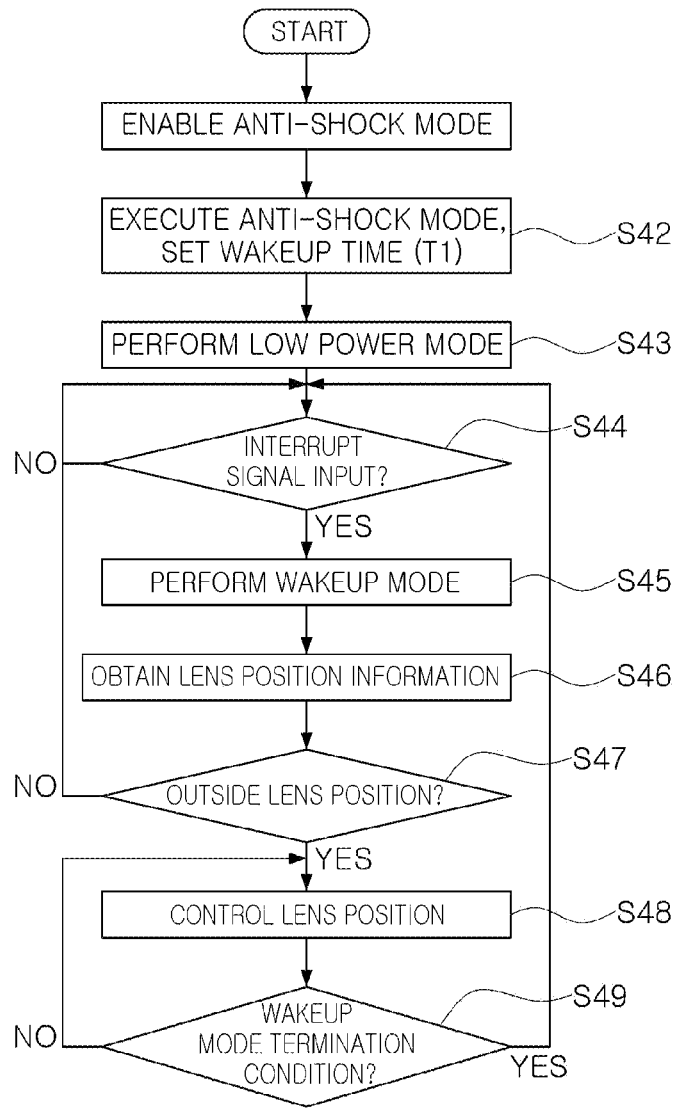
FIG. 4 is a view illustrating an example of an execution process of an anti-shock mode.

FIG. 4 is a view illustrating an example of an execution process of an anti-shock mode.

Referring to FIG. 4, when the camera module does not operate and the anti-shock mode is enabled, the controller 100 of the camera module 20 executes the anti-shock mode to set the wakeup time T1 (S42) and perform a low power mode (S43).

When the interrupt signal Sint is input from the timer 200 during the low power mode (S44), the controller 100 may perform the wakeup mode (S45), obtain lens position information through the lens position obtaining unit 300 (FIG. 1) during the wakeup mode (S46), and determine whether the obtained lens position is outside of the lens position determined to a preset upper limit position and lower limit position (S47), and when the obtained lens position is not outside of the lens position, the controller 100 may perform the low power mode again.

Unlike this, when the lens position obtained by the lens position obtaining unit 300 is outside of the preset lens position, the controller 100 may control the lens driving unit (400 in FIG. 1) to position the lens to the preset lens position (S48).

Also, when a wakeup mode termination condition is met during execution of the wakeup mode, the controller 100 may terminate the wakeup mode and perform the low power mode again, and when the wakeup mode termination condition is not met, the controller 100 performs the wakeup mode (S49).

For example, the wakeup mode termination condition may be a case in which the obtained lens position is not outside of the preset lens position, and may be a case in which controlling a current lens position to the preset lens position is completed when the obtained lens position is outside of the preset lens position.

Figure 5:
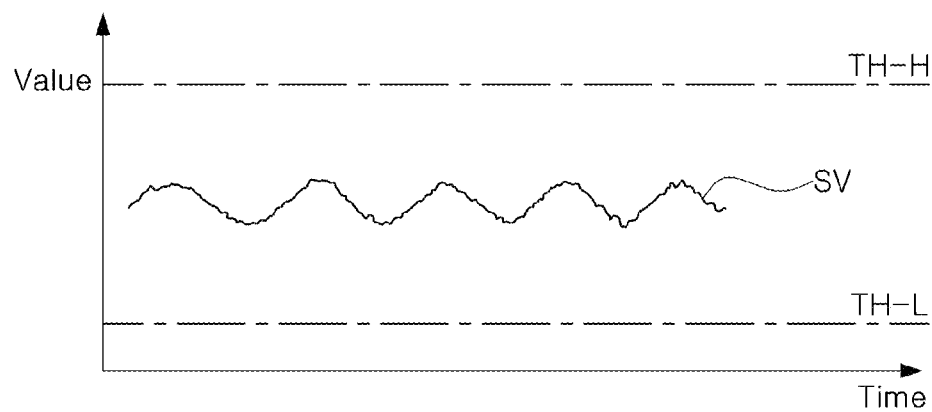
FIG. 5 is a view illustrating an example of an acceleration sensing signal when there is no external shock.
Figure 6:
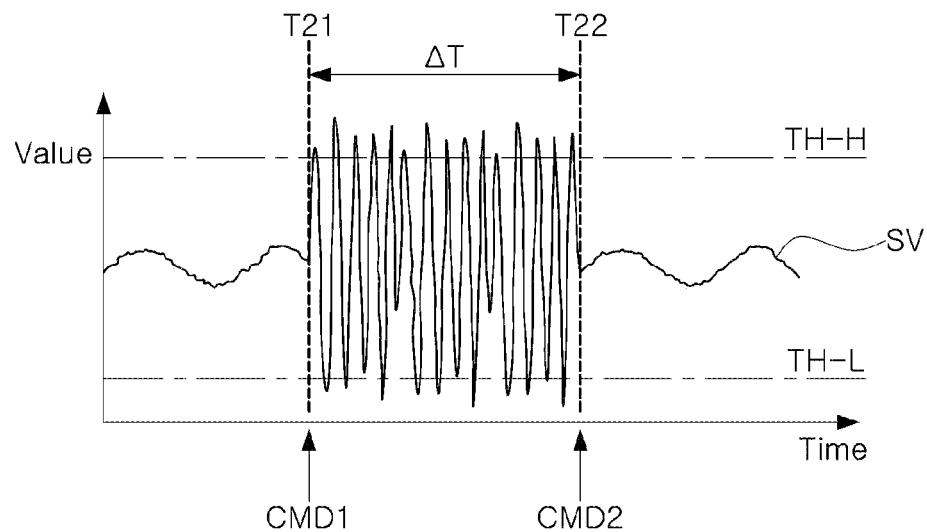
FIG. 6 is a view illustrating an example of an acceleration sensing signal when there is an external shock.

FIG. 5 is a view illustrating an example of an acceleration sensing signal when there is no external shock, and FIG. 6 is a view illustrating an example of an acceleration sensing signal when there is an external shock.

The acceleration sensing signal SV shown in FIG. 5 is a signal state when there is no external shock, and the acceleration sensing signal SV shown in FIG. 6 is a signal state when there is an external shock.

Referring to FIG. 5, it can be seen that the acceleration sensing signal SV does not exceed an upper limit threshold TH-H and a lower limit threshold TH-L.

Referring to FIG. 6, at a time point T21 when an external shock occurs, the mobile device processor (12 in FIG. 2) may generate the anti-shock execution command CMD1, and at a time point T22 when the external shock disappears, the mobile device processor (12 in FIG. 2) may generate the anti-shock release command CMD2.

Referring to FIG. 5, it can be seen that the acceleration sensing signal SV does not exceed the upper limit threshold TH-H and the lower limit threshold TH-L. Here, the anti-shock mode may be continuously executed during the time ΔT from the time point T21 when the external shock occurs to the time point T22 when the external shock disappears.

Figure 7:
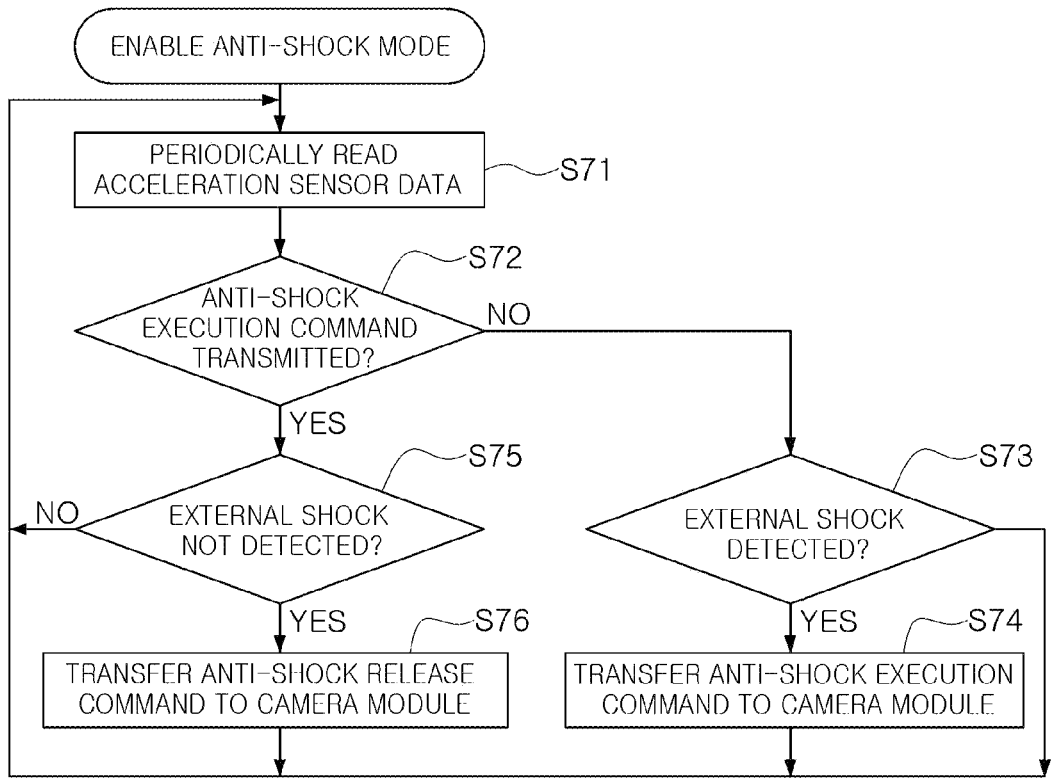
FIG. 7 is a view illustrating an example of an operation of a mobile device processor.

FIG. 7 is a view illustrating an example of an operation of a mobile device processor.

Referring to FIG. 7, in a state in which the camera module (20 in FIG. 2) is not in use, the anti-shock mode is enabled, and the mobile device processor (12 in FIG. 2) periodically reads an acceleration sensing signal (SV in FIG. 2) (acceleration sensor data) from the acceleration sensor (14 in FIG. 2) (S71).

The mobile device processor (12 in FIG. 2) determines whether the anti-shock execution command CMD1 has been transmitted to the camera module 20 (S72). When the mobile device processor (12 in FIG. 2) does not transmit the anti-shock execution command CMD1 to the camera module 20, the mobile device processor (12 in FIG. 2) determines whether an external shock is detected based on data (acceleration sensing signal SV) from the acceleration sensor (14 in FIG. 2) (S73), and when an external shock is detected, the mobile device processor (12 in FIG. 2) transmits the anti-shock execution command CMD1 to the camera module (S74).

When the mobile device processor (12 in FIG. 2) transmits the anti-shock execution command CMD1 to the camera module 20, the mobile device processor (12 in FIG. 2) determines whether an external shock is detected based on the acceleration sensor data (acceleration sensing signal SV) from the acceleration sensor (14 in FIG. 2) (S75), and when there is no external shock detection, the mobile device processor (12 in FIG. 2) transmits the anti-shock release command CMD2 to the camera module 20 (S76).

As described above, when the camera module (20 in FIG. 2) is not in use and there is an external shock to the mobile device (1 in FIG. 2), the mobile device processor (12 in FIG. 2) may transmit the anti-shock execution command CMD1 to the camera module 20.

During the execution of the anti-shock mode, when the anti-shock release command CMD2 generated when there is no external shock to the mobile device (1 in FIG. 2) is input, the controller (100 in FIG. 1) may stop the execution of the anti-shock mode in response to the anti-shock release command CMD2.

Also, when the anti-shock release command CMD2 is not input during the execution of the anti-shock mode, the controller (100 in FIG. 1) may continuously maintain the execution of the anti-shock mode.

Figure 8:
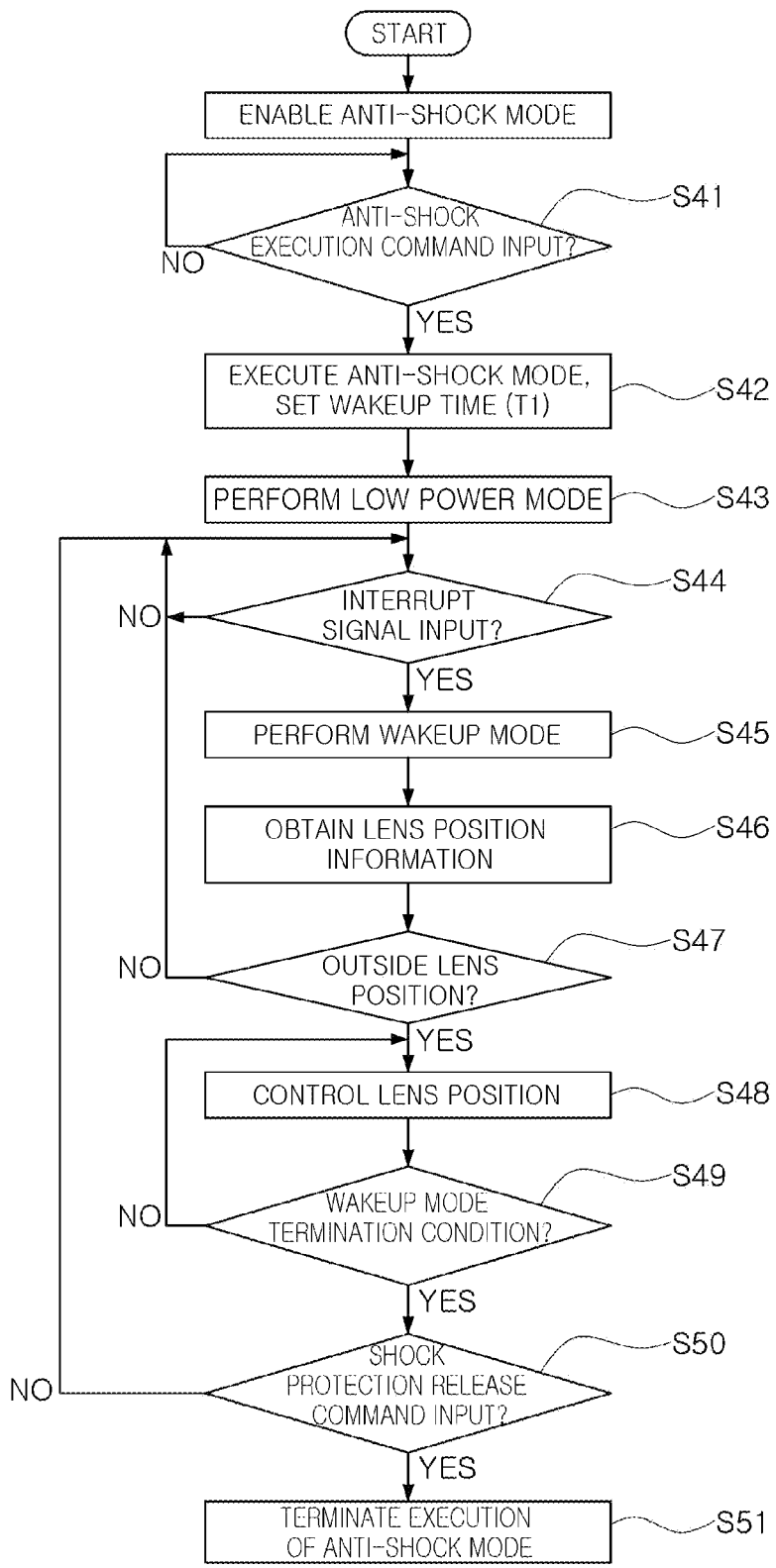
FIG. 8 is a view illustrating an example of an operation of a camera module.

FIG. 8 is a view illustrating an example of an operation of a camera module.

The example of the camera operation shown in FIG. 8 is a modified example of the operation of the camera module shown in FIG. 4.

Referring to FIG. 8, the process repeated with FIG. 4 will be omitted, and a difference will be mainly described. When the anti-shock execution command CMD1 is input from the mobile device body portion 10, the camera module (20 in FIG. 2) may execute the anti-shock mode (S41 and S42).

When the anti-shock release command CMD2 is received during the anti-shock mode, the execution of the anti-shock mode may be terminated (S50 and S51).

Figure 9:
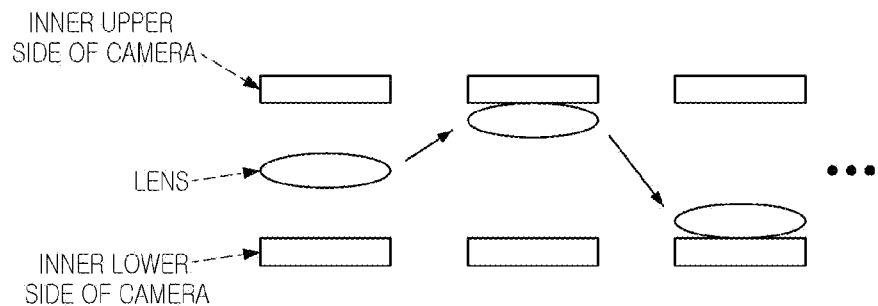
FIG. 9 is a view illustrating an example of a lens shock in case of an external shock when an anti-shock mode does not operate.
Figure 10:
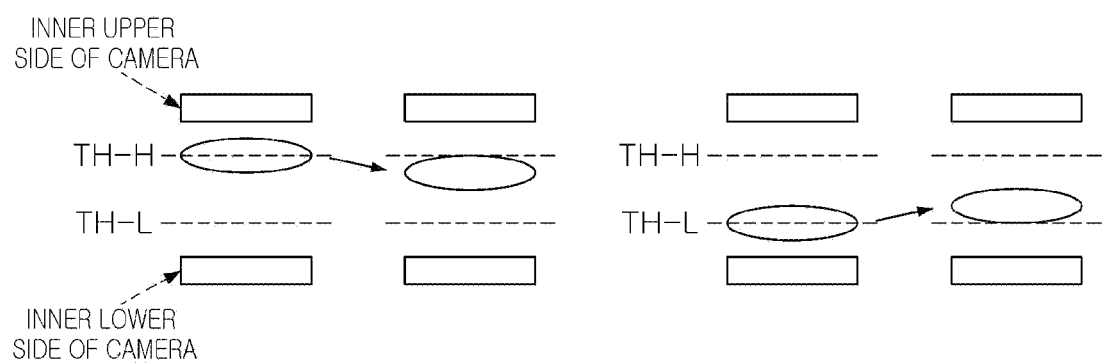
FIG. 10 is a view illustrating an example showing that a lens is protected from an external shock when an anti-shock mode operates.

FIG. 9 is a view illustrating an example of a lens shock in case of an external shock when the anti-shock mode does not operate, and FIG. 10 is a view illustrating an example of a lens shock being protected in a case of an external shock when the anti-shock mode operates.

Referring to FIG. 9, when the anti-shock mode does not operate in the camera module, the lens of the camera module may collide with an inner upper or lower surface of the camera module when an external shock occurs to the mobile device.

For example, since the lens is formed of a movable member that may vary in position to support operations, such as OIS, AF, and zoom, when the camera module is not used usually, an external shock may be transmitted to the camera module as it is.

Referring to FIG. 10, in order to prevent such a lens from being shocked, the anti-shock mode may be performed to wake up intermittently, and when there is an external shock based on the acceleration sensing signal SV of the acceleration sensor 14, a lens position may be detected, and when it is smaller than or greater than a threshold value, a closed loop control may be executed.

For example, if the lens position is changed by an external shock and is larger or smaller than the threshold value, the lens position may be appropriately adjusted so that the lens may not collide with a wall such as an upper surface or a lower surface and may not make a sound or do damage, thereby preventing a collision of the lens.

For example, as shown in FIG. 10, the anti-shock mode of the present disclosure is executed, and when the lens deviates from the range based on the preset upper and lower thresholds TH-H and TH-L, the lens may be controlled to fall within the threshold values to prevent the occurrence of a shock.

The mobile device 1, mobile body portion 10, mobile device processor 12, acceleration sensor 14, camera module 20, actuator 30, position sensor 50, controller 100, timer 200, lens position obtaining unit 300, lens driving unit 400, and other apparatuses, devices, units, modules, and components described herein with respect to FIGS. 1-10 are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

According to an example embodiment of the present disclosure, when the camera module of the mobile device is not in use, even if the mobile device is shocked from the outside, the anti-shock mode may be executed to prevent collision caused by lens movement of the camera module in advance with low power.

In addition, the anti-shock mode may be executed when the mobile device receives an external shock to intermittently perform the wakeup mode of the anti-shock mode to monitor a position of the lens and adjust the position of the lens, thereby preventing a shock due to the movement of the lens of the camera module and preventing damage to the camera module due to the corresponding shock in advance.

In particular, when the mobile device receives an external shock, the anti-shock execution command CMD1 may be transmitted to the camera module, and when there is no external shock, the anti-shock release command may be transmitted, so that the camera module may execute the anti-shock mode only when there is an external shock, thereby further reducing power consumption.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a controller configured to execute an anti-shock mode including a low power mode and a wakeup mode, that alternately performs the low power mode and the wakeup mode when the anti-shock mode is enabled, and controls a position of a lens based on a lens position detected during the performance of the wakeup mode; and
a timer for generating an interrupt signal at predetermined wakeup time intervals, while the anti-shock mode is executed,
wherein the controlling of the position of the lens comprises a generation, during the wakeup mode when the camera module is not used, of an anti-shock execution command to drive a movement of the lens to an anti-shock position.

2. The camera module of claim 1, wherein the controller is configured to perform the wakeup mode at the wakeup time intervals based on the interrupt signal from the timer.

3. The camera module of claim 1, wherein the controller is configured to determine whether the lens position is outside of a preset lens position range during the wakeup mode, and perform the low power mode when the lens position is not outside of the range.

4. The camera module of claim 1, wherein the controller is configured to determine whether the lens position is outside of a preset lens position range during the wakeup mode, and control a preset position of the lens when it is determined that the lens position is outside of the range.

5. The camera module of claim 1, wherein the anti-shock execution command is input from a mobile device processor when the camera module is not used.

6. The camera module of claim 1, wherein the anti-shock execution command is input from a mobile device processor when there is an external shock on the mobile device, without using the camera module.

7. The camera module of claim 1, wherein, when an anti-shock release command is generated when there is no external shock to the mobile device during the execution of the anti-shock mode, the controller is configured to stop the execution of the anti-shock mode in response to the anti-shock release command.

8. The camera module of claim 7, wherein, when the anti-shock release command is not input during execution of the anti-shock mode, the controller is configured to maintain the execution of the anti-shock mode.

9. A mobile device comprising:
the camera module of claim 1; and
a mobile device processor configured to generate the anti-shock execution command when an anti-shock execution condition is met.

10. A mobile device comprising:
a mobile device processor configured to generate an anti-shock execution command when an anti-shock execution condition is met when the camera module is not used; and
a camera module, when the anti-shock execution command is input, executing an anti-shock mode including a low power mode and a wakeup mode in response to the anti-shock execution command,
wherein the camera module comprises one or more processors configured to:
execute the anti-shock mode that alternately performs the low power mode and the wakeup mode to control a position of a lens based on a lens position detected during the performance of the wakeup mode;
generate an interrupt signal at predetermined wakeup time intervals, while the anti-shock mode is executed;
determine the lens position; and
drive the position of the lens to an anti-shock position during the wakeup mode, in response to the anti-shock execution command and the position of the lens, when the camera module is not used.

11. The mobile device of claim 10, wherein the one or more processors are configured to perform the wakeup mode at the wakeup time intervals based on the interrupt signal.

12. The mobile device of claim 10, wherein the one or more processors are configured to determine whether the lens position is outside of a preset lens position range during the wakeup mode, and perform the low power mode when the lens position is not outside of the range.

13. The mobile device of claim 10, wherein the one or more processors are configured to determine whether the lens position is outside of a preset lens position range during the wakeup mode, and control a preset position of the lens when it is determined that the lens position is outside of the range.

14. The mobile device of claim 10, wherein when the camera module is not used, the mobile device processor is configured to generate the anti-shock execution command and outputs the generated anti-shock execution command to the camera module.

15. The mobile device of claim 10, wherein the mobile device processor is configured to generate the anti-shock execution command and outputs the generated anti-shock execution command to the camera module when there is an external shock to the mobile device without using the camera module.

16. The mobile device of claim 10, wherein, when an anti-shock release command is generated when there is no external shock to the mobile device during the execution of the anti-shock mode, the one or more processors are configured to stop the execution of the anti-shock mode in response to the anti-shock release command.

17. The mobile device of claim 16, wherein, when the anti-shock release command is not input during execution of the anti-shock mode, the one or more processors are configured to maintain the execution of the anti-shock mode.

18. A camera module comprising:
one or more pro configured to:
execute a low power mode when the camera module is not in use and receive an interrupt signal at a predetermined time interval or an anti-shock execution command signal to execute a wakeup mode;
transmit a lens position signal during the wakeup mode; and
drive a position of the lens during the wakeup mode,
wherein the one or more processors, in response to the interrupt signal or the anti-shock execution command signal, are configured to drive the position of the lens to an anti-shock position when the camera module is not in use in response to the lens position signal during the wakeup mode.

19. The camera module of claim 18, further comprising a timer configured to transmit the interrupt signal at the predetermined time interval to the one or more processors.

20. A mobile device comprising:
the camera module of claim 18; and
a mobile device processor is configured to transmit the anti-shock execution command signal when a predetermined anti-shock execution threshold is met.

* * * * *